US011274948B2

(12) United States Patent
Raman et al.

(10) Patent No.: US 11,274,948 B2
(45) Date of Patent: *Mar. 15, 2022

(54) REMOTE FACADE INSPECTION GANTRY

(71) Applicant: RevolutioNice Inc., Belleville, NJ (US)

(72) Inventors: Sreenivas Raman, Park Ridge, NJ (US); Elie Cherbaka, Franklin Lakes, NJ (US); Ryan J. Giovacchini, Trenton, NJ (US); Brian Jennings, Merrmack, NH (US); Thomas C. Slater, New York, NY (US)

(73) Assignee: RevolutioNice Inc., Belleville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,901

(22) Filed: Aug. 12, 2019

(65) Prior Publication Data

US 2020/0109972 A1 Apr. 9, 2020

Related U.S. Application Data

(63) Continuation of application No. 15/206,167, filed on Jul. 8, 2016, now Pat. No. 10,378,935.

(Continued)

(51) Int. Cl.
*G01D 11/30* (2006.01)
*E04G 23/02* (2006.01)
(Continued)

(52) U.S. Cl.
CPC ............. *G01D 11/30* (2013.01); *E04G 23/00* (2013.01); *E04G 23/0296* (2013.01); *G01D 11/24* (2013.01)

(58) Field of Classification Search
CPC .... G01D 11/30; G01D 11/24; E04G 23/0296; E04G 23/00

(Continued)

(56) References Cited

U.S. PATENT DOCUMENTS 5,421,783 A 6/1995 Kockelman et al.
5,742,335 A 4/1998 Cannon
(Continued)

FOREIGN PATENT DOCUMENTS

CN 106426225 2/2017
IN 201721000991 1/2017
(Continued)

OTHER PUBLICATIONS

Abdellatif, Mohamed, "Design of An Autonmous Wall Painting Robot" Mechatronics and Robotics Dept. Egypt-Japan University of Science and Technology, Alexandria, Egypt, Aug. 2012. https://www.researchgate.net/?publication/236659040_Design_of_An_Autonomous_Wall_Painting_Robot.
(Continued)

*Primary Examiner* — Robert R Raevis
(74) *Attorney, Agent, or Firm* — Brient IP Law, LLC

(57) ABSTRACT

A facade gantry allows for close inspection of a facade using remotely operated cameras, probes, and/or sampling devices. These devices are located in a housing that is positioned in front of a facade by a system of cables, from which it is suspended, that allow for movement in any direction in a plane. Two cables are attached to the housing containing the sensors and tools and are wound onto two separate spools located on the roof at the vertical boundaries of the inspection area. By winding and unwinding these spools, the housing can be raised, lowered, and moved from side to side. The invention further has an optional "shed" located on the ground that protects pedestrians in the case of a suspension system failure. The shed moves to maintain a position directly under the housing. The gantry optionally allows for repair of the facade by using remotely operated repair tools.

19 Claims, 6 Drawing Sheets

Related U.S. Application Data

(60) Provisional application No. 62/190,214, filed on Jul. 8, 2015, provisional application No. 62/193,565, filed on Jul. 16, 2015, provisional application No. 62/276,218, filed on Jan. 7, 2016.

(51) Int. Cl.
*E04G 23/00* (2006.01)
*G01D 11/24* (2006.01)

(58) Field of Classification Search
USPC .............. 73/152.01, 152.02, 152.05–152.17, 73/152.39–152.42, 152.51–152.59, 865.8, 73/866.5; 248/323–332, 1–250
See application file for complete search history.

(56) References Cited

U.S. PATENT DOCUMENTS

| | | | |
|---|---|---|---|
| 6,319,140 | B1 | 11/2001 | Mirfin et al. |
| 6,832,864 | B2 | 12/2004 | Patton et al. |
| 7,770,695 | B2 | 8/2010 | Myers |
| 7,839,417 | B2 | 11/2010 | Ebensberger et al. |
| 7,981,462 | B2 | 7/2011 | Buestgens |
| 8,050,799 | B2 | 11/2011 | Eickmeyer et al. |
| 8,291,855 | B2 | 10/2012 | Hoerl, Jr. et al. |
| 8,403,302 | B2 | 3/2013 | Erel et al. |
| 8,838,273 | B2 | 9/2014 | Hvass et al. |
| 9,427,874 | B1 | 8/2016 | Rublee |
| 9,579,048 | B2 | 2/2017 | Rayner et al. |
| 9,592,609 | B2 | 3/2017 | Lafary et al. |
| 9,919,330 | B2 | 3/2018 | Letard et al. |
| 10,378,935 | B1 * | 8/2019 | Raman ............... G01D 11/24 |
| 2006/0283981 | A1 | 12/2006 | Mead et al. |
| 2009/0299525 | A1 | 12/2009 | Takahashi et al. |
| 2013/0122186 | A1 | 5/2013 | Hoppel |
| 2014/0242285 | A1 | 8/2014 | Pettersson et al. |
| 2015/0274294 | A1 | 10/2015 | Dahlstrom |
| 2016/0001190 | A1 | 1/2016 | Davis |
| 2016/0001443 | A1 | 1/2016 | Davis |
| 2016/0052126 | A1 | 2/2016 | Chin et al. |
| 2016/0121486 | A1 | 5/2016 | Lipinski et al. |
| 2016/0144512 | A1 | 5/2016 | Kim |
| 2016/0299509 | A1 | 10/2016 | Ueda et al. |
| 2017/0036351 | A1 | 2/2017 | Sorensen et al. |
| 2017/0081162 | A1 | 3/2017 | Ahern et al. |

FOREIGN PATENT DOCUMENTS

| | | |
|---|---|---|
| WO | 2016109721 | 7/2016 |
| WO | 2017063652 | 4/2017 |

OTHER PUBLICATIONS

Final Office Action, dated Aug. 31, 2018, from corresponding U.S. Appl. No. 15/185,465.
Final Office Action, dated Jul. 26, 2018, from corresponding U.S. Appl. No. 14/999,676.
GCR, "Spray-painting Robot Makes Painters Redundant", Global Construction Review, Oct. 27, 2016. http://www.globalconstructionreview.com/innovation/spray-painting-robot-mak7es-painte7rs-redund7ant/.
International Search Report, dated Aug. 31, 2018, from corresponding International Application No. PCT/US2018/035644.
Keerthanaa, P. et al., "Automatic Wall Painting Robot" International Journal of Innovative Research in Science, Engineering and Technology, Jul. 2013, 3009-3023, vol. 2, Issue 7, IJIRSET. https://www.ijirset.com/upload/july/59_AUTOMATIC.pdf.
Notice of Allowance, dated Jun. 29, 2018, from corresponding U.S. Appl. No. 15/832,505.
Notice of Allowance, dated Mar. 27, 2019, from corresponding U.S. Appl. No. 15/206,167.
Notice of Allowance, dated Oct. 1, 2018, from corresponding U.S. Appl. No. 15/206,167.
Office Action, dated Apr. 26, 2018, from corresponding U.S. Appl. No. 15/206,167.
Office Action, dated Dec. 5, 2017, from corresponding U.S. Appl. No. 15/185,465.
Office Action, dated Dec. 7, 2017, from corresponding U.S. Appl. No. 14/999,676.
Office Action, dated Mar. 9, 2018, from corresponding U.S. Appl. No. 15/832,505.
Restriction Requirement, dated Jan. 25, 2018, from corresponding U.S. Appl. No. 15/206,167.
Restriction Requirement, dated Sep. 21, 2017, from corresponding U.S. Appl. No. 14/999,676.
Restriction Requirement, dated Sep. 22, 2017, from corresponding U.S. Appl. No. 15/185,465.
Written Opinion of the International Searching Authority, dated Aug. 31, 2018, from corresponding International Application No. PCT/US2018/035644.

* cited by examiner

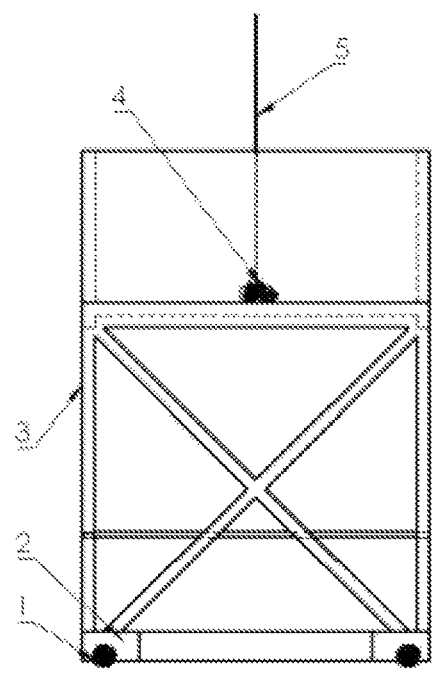
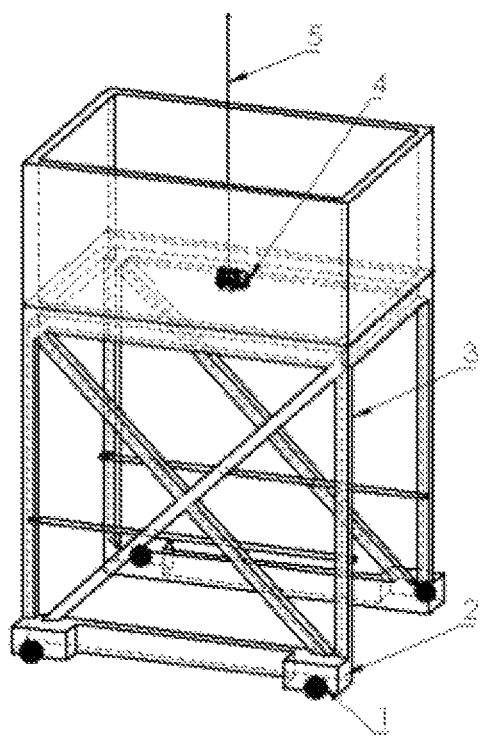
Fig. 2a   Fig. 2b
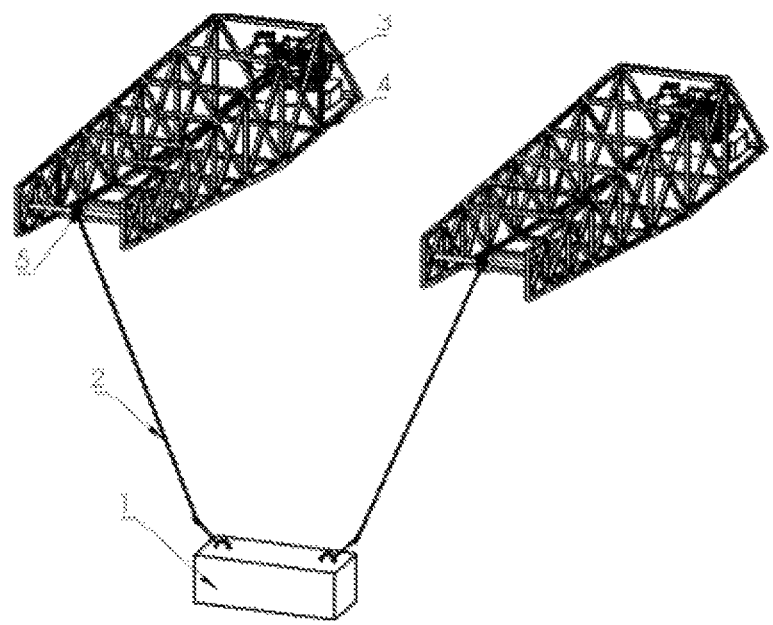
Fig. 3

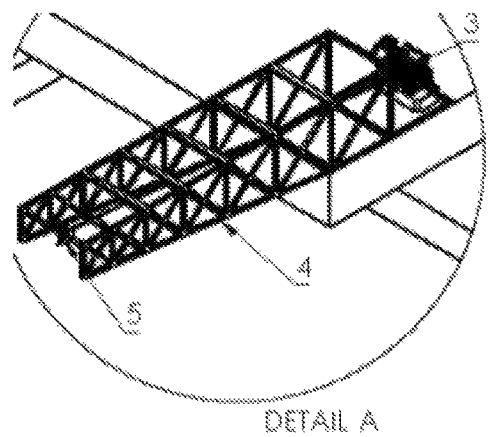
Fig. 7a
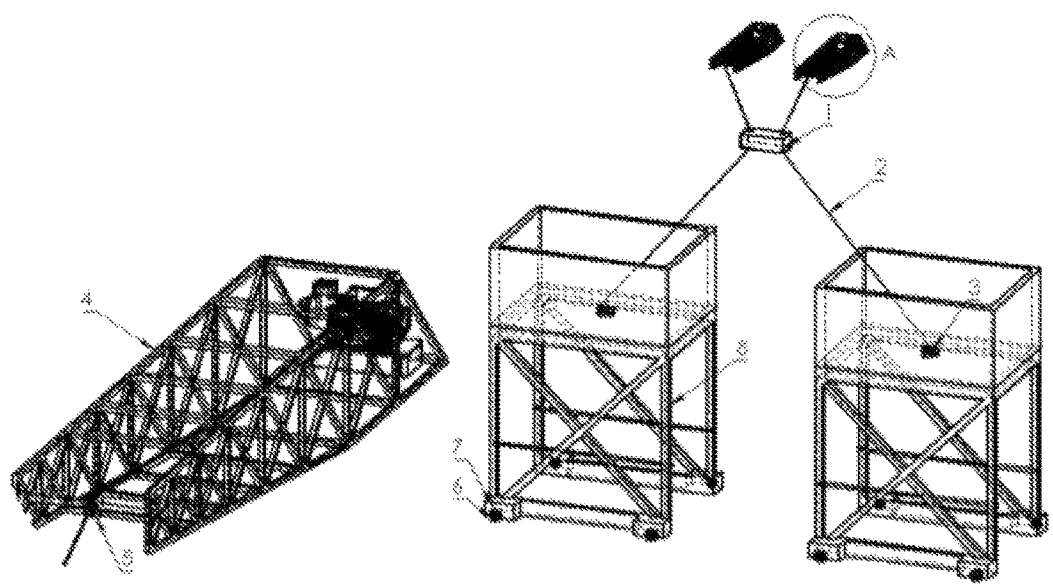
Fig. 6
Fig. 7b
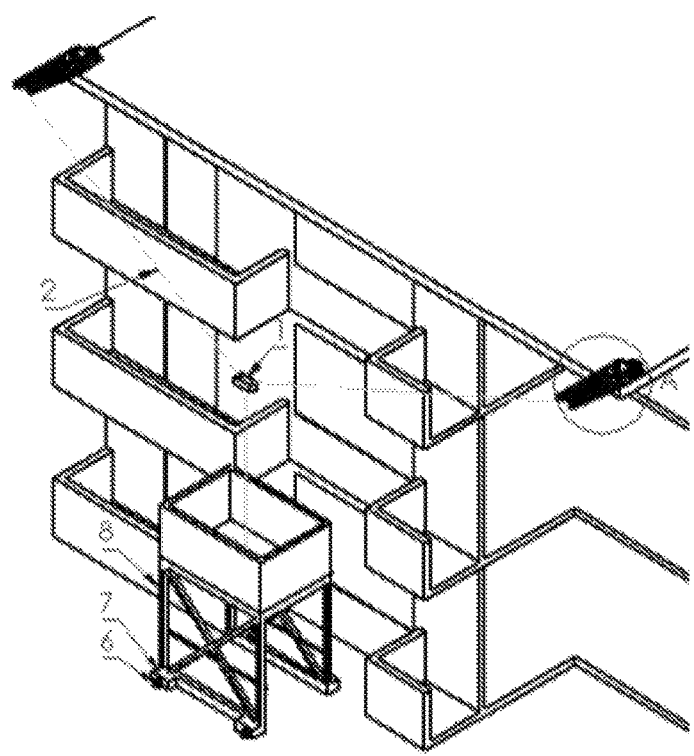
Fig. 8

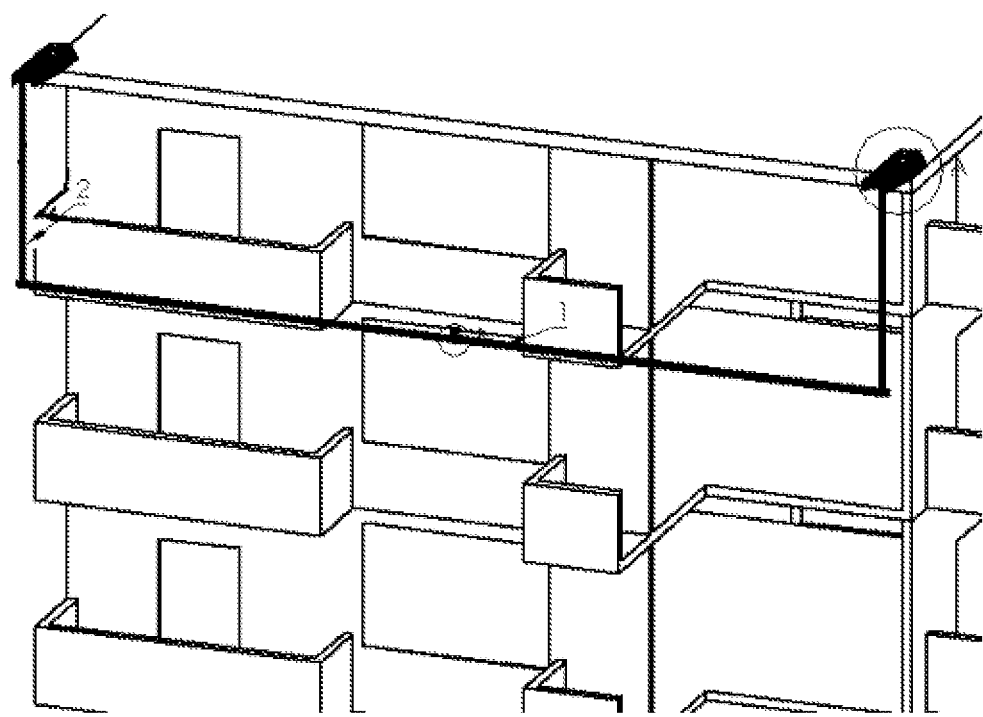
Fig. 9
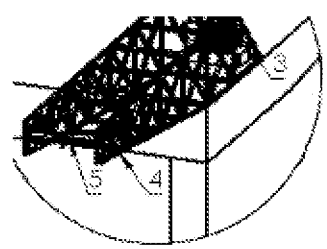 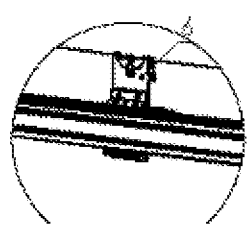
Fig. 10  Fig. 11

REMOTE FACADE INSPECTION GANTRY

CROSS-REFERENCES TO RELATED APPLICATIONS

This application is a continuation of application Ser. No. 15/206,167, filed Jul. 8, 2016 (now, U.S. Pat. No. 10,378,935), which claimed the benefit of the following U.S. Provisional Applications: (1) Ser. No.: 62/190,214, filed Jul. 8, 2015; (2) Ser. No.: 62/193,565, filed Jul. 16, 2015; and (3) Ser. No.: 62/276,218, filed Jan. 7, 2016, the contents of each of which are incorporated by reference herein in their entirety.

FIELD OF THE INVENTION

Embodiments of the present invention include building inspection systems, and more specifically, facade inspection systems.

BACKGROUND OF THE INVENTION

Building facades are large, difficult to access and require regular inspection to ensure that they are in good condition and have not degraded in a manner that exposes building occupants or passersby to danger. Currently, facade inspectors rely on aerial work platforms or scaffolding to position themselves close enough to the facade to adequately inspect it. The use of lifts and scaffolding is expensive, time consuming, and exposes the inspector to a fall risk. A system to allow for remote detailed inspection of facades would minimize these problems, reducing the cost and time needed for facade inspections as well as eliminating the risk to workers and inspectors of injury as they would otherwise need to work at great heights.

BRIEF SUMMARY OF THE INVENTION

An object of the present invention is a facade inspection system.

Another object of the present invention is a remote controlled facade inspection system.

And another object of the present invention is a partially automated facade inspection system.

Yet another object of the present invention is a facade repair system.

Still another object of the present invention is a remote controlled facade repair system.

And another object of the present invention is a partially automated facade repair system.

An embodiment of this invention allows for close inspection of a facade using remotely operated cameras, probes, and/or sampling devices. These devices are located in a housing that is positioned in front of a façade by a system of cables, from which it is suspended, that allow for movement in any direction in a plane. Two cables are attached to the housing containing the sensors and tools and are wound onto two separate spools located on the roof at the vertical boundaries of the inspection area. By winding and unwinding these spools, the housing can be raised, lowered, and moved from side to side. In various other embodiments of the invention, one or more cables extend from the housing to a device located on the ground. In one embodiment, cable will extend down from the housing to a powered "shed" located on the ground that protects pedestrians in the case of a suspension system failure. The shed moves to maintain a position directly under the housing. The cable attaching the housing to the shed is tensioned to reduce the possibility of the housing swinging towards or away from the facade. As the operator signals for the housing to move, the cables are either wound onto or unwound from the powered spools to achieve the desired housing movement and the shed moves to remain beneath the housing.

In other embodiments, one or two powered spools are located in fixed positions on the ground and are used to aid in positioning the housing and reduce any wind-induced swaying. One or more of the cables may optionally also contain, carry, or function as a data and power link that allows for the real time transmission of sensor data and the operation of equipment located in the housing or data transmission between the housing and controller may be wireless and housing power may be supplied by an onboard battery.

In various embodiments, tools mounted in the housing are able retrieve facade material for later analysis or use tools and sensors to probe, analyze, and/or repair the facade.

In some embodiments, the housing has the functionality of or is rigidly attached to a quadcopter. In this embodiment, the housing can fly to the facade from an initial suspended position, affix itself to the facade and perform needed operations. All components are controlled by an operator using a controller that also allows real time monitoring of the system. The data generated by the device can be used to create highly detailed images and three dimensional models of the facade which can then be analyzed to determine if there are any problems with the facade that require repair.

BRIEF DESCRIPTION OF THE SEVERAL VIEWS OF THE DRAWING

FIGS. 1-13 show various embodiments and details of the invention.

DESCRIPTION OF THE INVENTION

Figure 1:
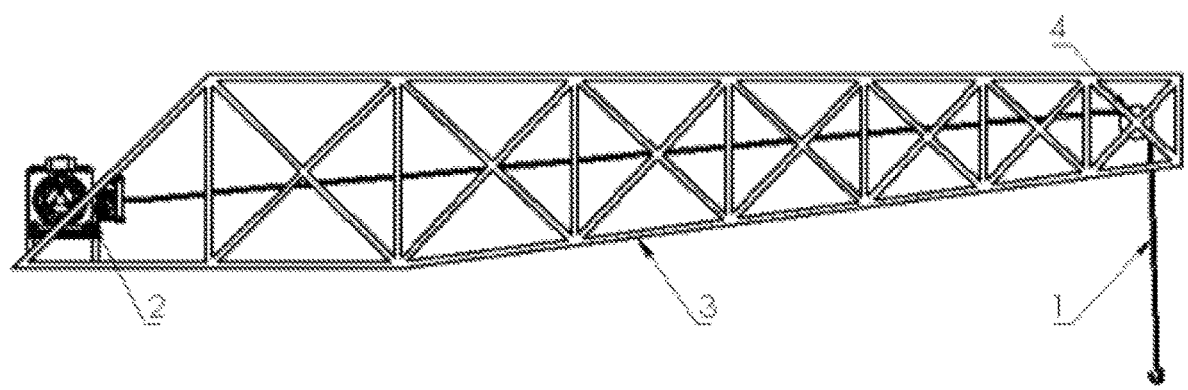
Figures 4, 5:
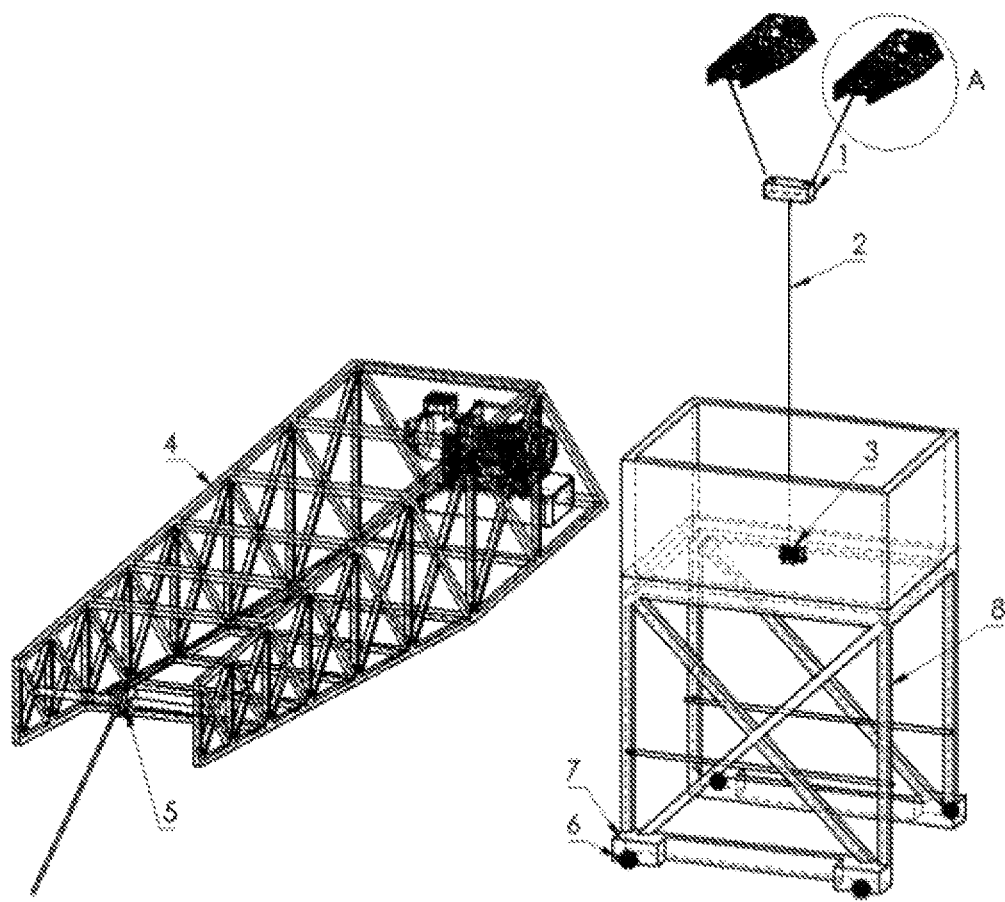
Figure 12:
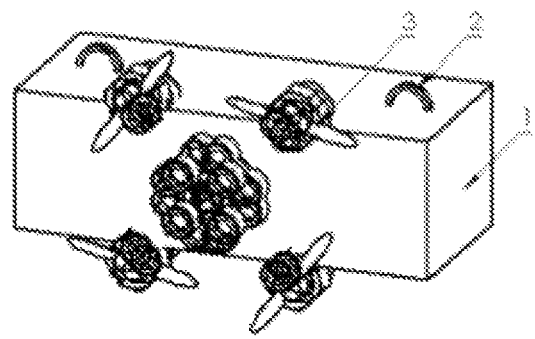
Figure 13:
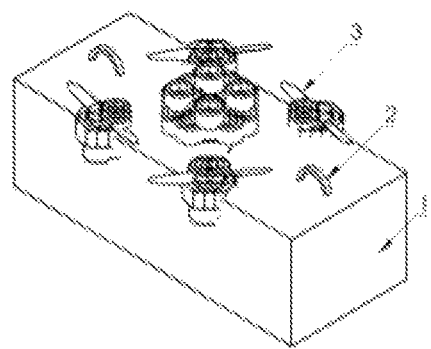

The cable positioning system comprises two powered spools that are mounted on the roof of the building. As the housing will not be able to move the location of the spools, they establish the vertical boundaries of the inspection area. A cable from each spool is attached to the housing as are any necessary data and power connections. The cables are routed through fixtures, preferably outrigger braces, that cantilever out from the face of the building and beyond any building features that may interfere with the movement of the housing, such as fire escapes and balconies. By winding and unwinding cable from the pulleys, the position of the housing in a plane that is parallel to the building facade and offset from it a distance determined by the length of the cantilevered fixtures can be changed.

In some embodiments, there is a distinct data cable. The data cable may be integrated with the suspension cables or may be a separate cable with a dedicated powered spool that is computer controlled to ensure an adequate but not excessive length of cable has been paid out.

Control software is able to dynamically change the rate at which each spool either releases or retracts cable to move the housing in a manner that is consistent with the desired movement as input to a controller by an operator. For example, for the housing to move in the horizontal direction while suspended below the two spools, they will have to constantly adjust the rate at which cable is being released and retracted, while the operator will only have to indicate that a horizontal movement is desired.

The housing encloses and provides a mounting area for tools and sensors and protects them from adverse weather and possible collisions with the building facade. The number and kind of sensors and tools inside the housing may be varied depending on the requirements of the job. Additionally, it is easy to add and replace components to increase the functionality or reduce the cost of the device. In most cases, there is a video and/or still camera that allows for the remote operator to visually inspect aspects of the facade and save image data for later analysis and/or the creation of three dimensional models. In various embodiments of the invention, the cameras are mounted on a gimbal to allow for their orientation to be changed if desired by an operator and/or are able to zoom in and out. Cameras that use wavelengths that are not visible by humans, such as infrared, are also present in various embodiments of the invention.

Other sensors and tools may need to be positioned very close to the facade and move independently of the housing to perform their intended function. To achieve this, in some embodiments of the invention, a device or manipulator to position a tool is integrated with the housing. The device, possibly a small multiaxis robotic arm, is capable of precise movements in very close proximity to the facade. It can also be used to with tools and sensors manipulate and probe the facade surface. For example, it may position and drive a drill into the facade in order to collect material for later analysis or to allow observation of the behavior of the subject material to determine its properties. Other possible sensors requiring close proximity to the facade and a precise positioning system include moisture sensors and borescopes.

In other embodiments of the invention, the housing has integrated propellers, motors, and controls to allow for flight capabilities along the lines of existing quadcopters or the housing may be affixed to a quadcopter. In this embodiment of the invention, the housing is positioned as described above unless the operator desires to be positioned closer to the facade to allow for more detailed inspection or the manipulation of facade elements. The device can enter a flight mode during which the device is positioned solely by the use of the propellers. While in this mode, the cables of the suspension system are slackened to allow for the free movement of the housing, but would prevent the device from falling to the ground in the event of a flight systems failure.

In some embodiments, the housing incorporates devices, possibly employing electrostatic adhesion, that allow it to be temporarily affixed to the facade and act as a stable platform for observing, measuring, probing, manipulating, altering, or affecting the facade. The system for temporarily affixing the device to the facade incorporates structural members that separate the housing from the adhesion components to create a gap between the housing face and the facade where tools and components can maneuver to achieve desired positions and configurations.

In some embodiments, the invention is capable of performing repairs to mitigate potential hazards. If a loose brick is observed, the device is able to affix netting to the facade to cover the brick to minimize danger until a more substantial repair can be performed. The invention has the capability of using different tools to affect different repairs. The manipulator is able to change tools using a tool changing mechanism that is affixed to the housing or, in another embodiment, the operator will retrieve the housing and manually attach a new tool to the manipulator. Possible end-of-manipulator tools include applicators capable of applying grout or tape. At the direction of the operator, either material can be applied to the façade or between facade elements in order to stabilize a section of facade that may be in danger of falling.

As there is a risk of debris falling from the facade during both inspection and repair work, in some embodiments of the invention, a system to catch small pieces of falling debris is present. The system consists of a net that can be quickly deployed and can span the distance between the housing and the facade. When not needed, it is retracted and stored in a manner that reduces the likelihood of it interfering with or catching on any part of the facade while the device is operating. When stored it also minimizes the force exerted by wind on the device.

When hoisting or suspending heavy materials from buildings in busy urban areas, the possibility of an unintended release of material needs to be accounted for. A temporary roof structure called a sidewalk shed is often constructed to shelter pedestrians from falling objects. These sheds are large and take time and money to erect. In various embodiments of this invention, there is a small, powered shed able to travel the length of the facade along the sidewalk to maintain a position directly beneath the housing. In various embodiments, a third powered cable spool will be mounted on this shed and a cable will extend from it up to the housing. This third cable will allow for the distance between the housing and the facade to be fixed as it eliminates a degree of freedom or movement which increases stability of the housing and its associated sensors and tools. This third cable may also contain, carry or function as a power and data link to allow for the transmission of housing location information to the shed and data and power as needed.

In various embodiments of the invention, the shed is not present and one or more powered spools are located on the ground with cables that are connected to the housing. These will act to reduce the possibility of housing movement towards or away from the facade and aid when the housing is directed to be positioned towards the boundaries of the plane in which it can move.

The devise is operated using a controller that allows for a human to direct the housing motion and the operation of sensors and tools. The controller also presents real time video and sensor data to the operator and allows for data to be saved for later analysis. The operator has the ability to note and save the position of the device at any point to allow for easy re-inspection of facade areas. The controller is capable of automatically guiding the device to a saved position from any point. Saved locations are able to be indexed and browsed with a photo of the facade area that is most easily observed from the corresponding position representing a device position. Data is from the housing to the controller through a wired connection to the housing or, in some embodiments, wirelessly.

In use, the invention is employed as described above.

Although this invention has been described with a certain degree of particularity, it is to be understood that the present disclosure has been made only by way of illustration and that numerous changes in the details of construction and arrangement of parts may be resorted to without departing from the spirit and scope of the invention.

What is claimed is:

1. A facade inspection and repair system comprising:
    a housing;
    an inspection tool operationally connected to the housing;
    a plurality of cables from which to suspend the housing; and
    a controller operationally connected to the cables;

a first outrigger brace configured to cantilever out from an upper portion of a building, wherein the first outrigger brace comprises a first motorized cable spool and a first pulley disposed adjacent an end of the first outrigger brace; and a second outrigger brace configured to cantilever out from the upper portion of the building, the second outrigger brace being spaced apart from the first outrigger brace along the upper portion of the building, wherein the second outrigger brace comprises a second motorized cable spool and a second pulley disposed adjacent an end of the second outrigger brace, wherein:

the plurality of cables comprise:
a first cable that is at least partially wound around the first motorized cable spool and extends from the first motorized cable spool through the first pulley to the housing;
a second cable that is at least partially wound around the second motorized cable spool and extends from the second first motorized cable spool through the second pulley to the housing;

the controller is configured to:
cause the first motorized cable spool to release and retract the first cable; and
cause the second motorized cable spool to release and retract the second cable; and the first motorized cable spool and the second motorized cable spool are configured to cooperate to adjust a position of the housing in a plane that is parallel to the facade of the building and offset from the façade of the building by a distance defined by a distance between the facade of the building and the first and second pulleys.

2. The facade inspection system of claim 1, further comprising
a third motorized cable spool disposed in a fixed position adjacent a ground in front of the building; and
a third cable that is at least partially wound around the third motorized cable spool and extends from the third motorized cable spool to the housing.

3. The facade inspection system of claim 2, further comprising
a fourth motorized cable spool disposed in a second fixed position adjacent the ground in front of the building; and
a fourth cable that is at least partially wound around the fourth motorized cable spool and extends from the fourth motorized cable spool to the housing.

4. The façade inspection system of claim 1, wherein the housing comprises one or more propellers configured to adjust a position of the housing relative to the facade of the building.

5. The façade inspection system of claim 1, further comprising at least one additional tool disposed adjacent the housing.

6. The façade inspection system of claim 5, wherein the at least one additional tool is configured to apply grout on the façade.

7. The façade inspection system of claim 5, wherein the at least one additional tool is configured apply material to the facade.

8. The façade inspection system of claim 7, wherein the at least one additional tool is configured to apply the material between two elements of the façade.

9. The façade inspection system of claim 8, wherein each of the two elements comprise a brick.

10. A facade inspection system comprising:
a housing;
an inspection tool operationally connected to the housing;
a plurality of cables from which to suspend the housing; and
a controller operationally connected to the cables, wherein:

the façade inspection system further comprises:
a first outrigger brace configured to cantilever out from an upper portion of a building, wherein the first outrigger brace comprises a first motorized cable spool and a first pulley disposed adjacent an end of the first outrigger brace; and
a second outrigger brace configured to cantilever out from the upper portion of the building, the second outrigger brace being spaced apart from the first outrigger brace along the upper portion of the building, wherein the second outrigger brace comprises a second motorized cable spool and a second pulley disposed adjacent an end of the second outrigger brace; and the plurality of cables comprise:
a first cable that is at least partially wound around the first motorized cable spool and extends from the first motorized cable spool through the first pulley to the housing;
a second cable that is at least partially wound around the second motorized cable spool and extends from second first motorized cable spool through the second pulley to the housing;

the controller is configured to:
cause the first motorized cable spool to release and retract the first cable; and
cause the second motorized cable spool to release and retract the second cable;

the first motorized cable spool and the second motorized cable spool are configured to cooperate to adjust a position of the housing in a plane that is parallel to the façade of the building and offset from the façade of the building by a distance defined by a distance between the façade of the building and the first and second pulleys.

11. The façade inspection system of claim 10, wherein:
the façade inspection system further comprises a safety shed disposed adjacent a ground in front of a façade of the building and comprising:
a rectangular frame;
a roof disposed adjacent an upper portion of the rectangular frame;
a third motorized cable spool disposed on the roof; and
at least one wheel; and
the plurality of cables further comprise a third cable that is at least partially wound around the third motorized cable spool and extends from the third motorized cable spool to the housing.

12. The façade inspection system of claim 11, wherein the first cable, the second cable, and the third cable are configured cooperate to maintain the housing a fixed distance from the façade.

13. The façade inspection system of claim 11, wherein the third cable is configured to remain in tension between the housing and the third motorized cable spool.

14. The façade inspection system of claim 11, wherein the shed is configured to roll on the at least one wheel along the ground in front of the façade of the building.

15. The façade inspection system of claim 14, wherein the controller is configured to cause the shed to maintain a position that is directly beneath the housing such that the shed is disposed between the housing and the ground as the housing moves within the plane.

16. The façade inspection system of claim 10, wherein the housing comprises one or more propellers.

17. The façade inspection system of claim 16, wherein the one or more propellers are configured to adjust a relative position of the housing relative to the façade of the building.

18. The façade inspection system of claim 17, wherein the housing comprises a quadcopter.

19. The façade inspection system of claim 18, wherein the first motorized cable spool and the second motorized cable spool are configured to slacken the first cable and the second cable to allow for free movement of the housing through operation of the quadcopter.

\* \* \* \* \*